US 9,020,480 B2

(12) United States Patent
Manuel et al.

(10) Patent No.: US 9,020,480 B2
(45) Date of Patent: Apr. 28, 2015

(54) METHOD, SYSTEM AND APPARATUS FOR CONFIGURING A MOBILE ELECTRONIC DEVICE

(75) Inventors: Arsel Manuel, Milton (CA); Piotr Madej, Mississauga (CA); Jia-Lin Chin, Scarborough (CA); Dan Steven Phillip Corrin, Kitchener (CA)

(73) Assignee: Blackberry Limited, Waterloo (CA)

(*) Notice: Subject to any disclaimer, the term of this patent is extended or adjusted under 35 U.S.C. 154(b) by 1024 days.

(21) Appl. No.: 13/103,146

(22) Filed: May 9, 2011

(65) Prior Publication Data

US 2012/0100841 A1    Apr. 26, 2012

Related U.S. Application Data

(60) Provisional application No. 61/405,721, filed on Oct. 22, 2010.

(51) Int. Cl.
| | |
|---|---|
| H04M 3/00 | (2006.01) |
| H04W 8/24 | (2009.01) |
| G06F 9/445 | (2006.01) |
| H04L 29/08 | (2006.01) |
| H04W 4/00 | (2009.01) |
| H04W 8/20 | (2009.01) |

(52) U.S. Cl.
CPC .......... *H04W 8/245* (2013.01); *G06F 9/44505* (2013.01); *H04W 8/205* (2013.01); *H04L 67/306* (2013.01); *H04L 67/125* (2013.01)

(58) Field of Classification Search
USPC ........................................................ 455/418
See application file for complete search history.

(56) References Cited

U.S. PATENT DOCUMENTS

| 8,301,141 | B1* | 10/2012 | Reeves et al. .............. 455/435.1 |
|---|---|---|---|
| 2005/0147072 | A1* | 7/2005 | Mahendran et al. .......... 370/338 |
| 2008/0043958 | A1 | 2/2008 | May et al. |
| 2009/0037425 | A1* | 2/2009 | Erickson et al. ................ 707/10 |
| 2010/0234009 | A1* | 9/2010 | Antani et al. .................. 455/419 |
| 2011/0164554 | A1* | 7/2011 | Jacks ............................ 370/320 |
| 2013/0023257 | A1* | 1/2013 | Murakami et al. ............ 455/418 |

FOREIGN PATENT DOCUMENTS

| EP | 1624710 A1 | 2/2006 |
|---|---|---|
| WO | 02084975 A2 | 10/2002 |
| WO | 03024139 A2 | 3/2003 |

(Continued)

OTHER PUBLICATIONS

European Patent Application No. 11165245.9 Search Report dated Mar. 21, 2012.

*Primary Examiner* — Timothy Pham
(74) *Attorney, Agent, or Firm* — Perry + Currier Inc.

(57) ABSTRACT

According to embodiments described in the specification, a method, system and apparatus for configuring a mobile electronic device are provided. The method comprises storing, in a memory of a provisioning server, a plurality of service records and one of a plurality of operation type parameters in association with each service record; receiving, at the provisioning server, a registration request for the mobile electronic device, the registration request including one or more identifiers identifying ones of the service records that are maintained in the mobile electronic device; selecting, based on the received identifiers and the operation type parameters, at least one service record for transmission; and, transmitting the at least one selected service record.

20 Claims, 6 Drawing Sheets

(56) References Cited

FOREIGN PATENT DOCUMENTS

| WO | 2008003081 | A2 | 1/2008 |
| WO | 2008086504 | A2 | 7/2008 |
| WO | 20090136194 | A2 | 11/2009 |

* cited by examiner

METHOD, SYSTEM AND APPARATUS FOR CONFIGURING A MOBILE ELECTRONIC DEVICE

FIELD

The specification relates generally to mobile electronic devices, and specifically to a method, system and apparatus for configuring a mobile electronic device.

BACKGROUND

The computational capabilities of mobile electronic devices (such as cellular phones, smart phones and the like) continue to grow. The resources of such devices (e.g. network bandwidth, battery power, processing power, memory capacity), however, remain scarce in comparison to mains-powered and wired personal computers. Thus, despite the growing capabilities of mobile electronic devices, their resources remain relatively limited and therefore valuable. Provisioning such devices can result in inefficient usage of these valuable resources.

BRIEF DESCRIPTIONS OF THE DRAWINGS

Embodiments are described with reference to the following figures, in which.

DETAILED DESCRIPTION OF THE EMBODIMENTS

According to an aspect of the specification, a method is provided for configuring a mobile electronic device. The method comprises storing, in a memory of a provisioning server, a plurality of service records and one of a plurality of operation type parameters in association with each service record; receiving, at the provisioning server, a registration request for the mobile electronic device, the registration request including one or more identifiers identifying ones of the service records that are maintained in the mobile electronic device; selecting, based on the received identifiers and the operation type parameters, at least one service record for transmission; and, transmitting the at least one selected service record.

According to another aspect of the specification, a non-transitory computer-readable medium is provided for storing computer-readable instructions executable by a processor for implementing the method.

According to a further aspect of the specification, a provisioning server is provided, comprising: a memory for storing a plurality of service records and one of a plurality of operation type parameters in association with each service record; a communications interface for receiving a registration request for a mobile electronic device, the registration request including one or more identifiers identifying ones of the service records that are maintained in the mobile electronic device; and, a processor interconnected with the memory and the communications interface, the processor configured to select, based on the received identifiers and the operation type parameters, at least one service record for transmission, the processor further configured to transmit the at least one selected service record via the communications interface.

Figure 1:
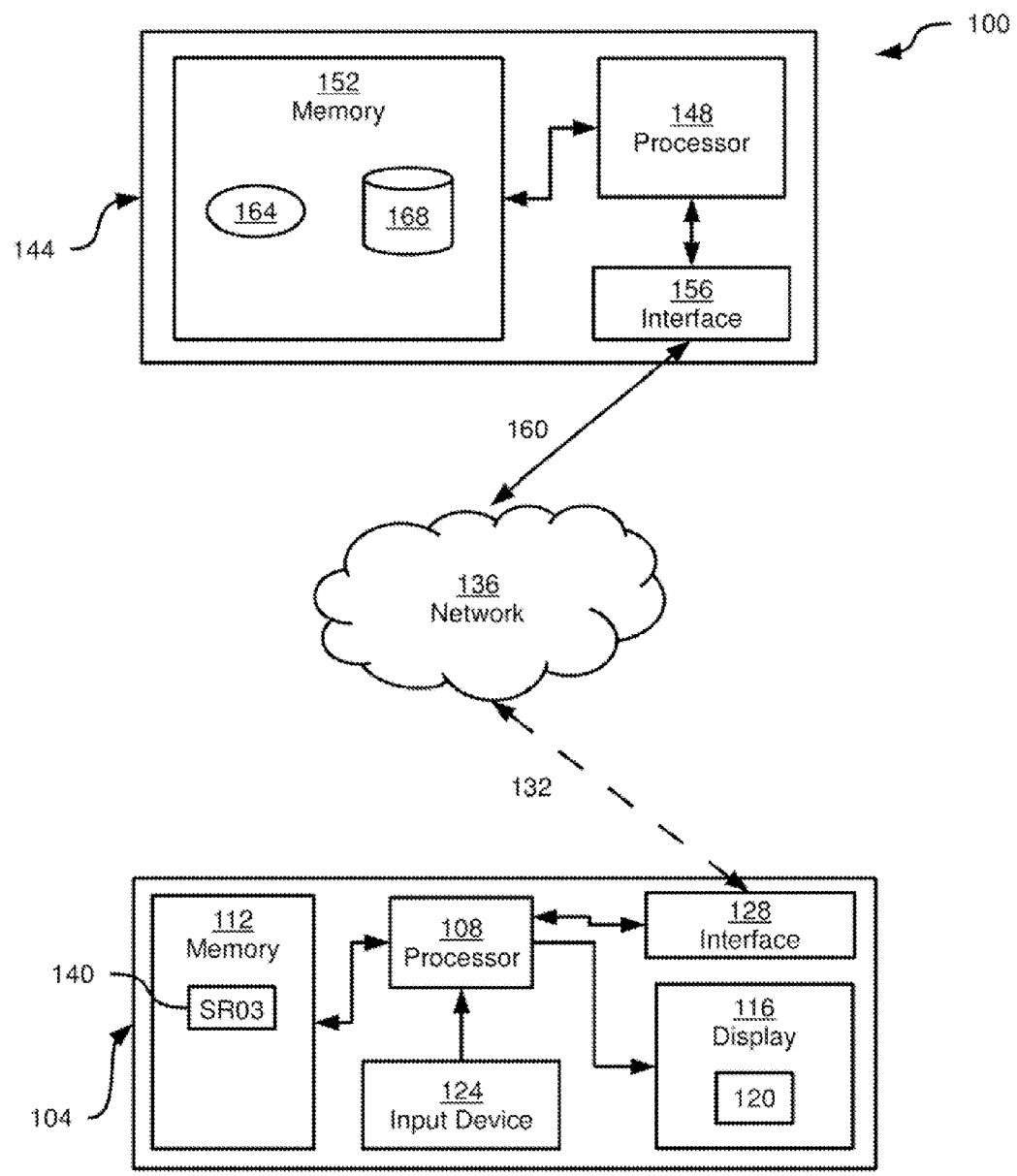
FIG. 1 depicts a system for configuring a mobile electronic device, according to a non-limiting embodiment.

FIG. 1 depicts a schematic block diagram of a system 100 for configuring a mobile electronic device 104. Mobile electronic device 104, in the presently described example embodiment, is based on the operating environment and functionality of a hand-held wireless communication device. It is contemplated, however, that the mobile electronic device 104 is not limited to a hand-held wireless communication device. Other mobile electronic devices are also contemplated, such as cellular telephones, smart telephones, Personal Digital Assistants ("PDAs"), media or MP3 players, laptop computers, tablet computers and the like.

Mobile electronic device 104 includes a processor 108 interconnected with a non-transitory computer readable storage medium such as memory 112. Memory 112 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

Mobile electronic device 104 also includes one or more output devices interconnected with processor 108, such as a display 116. It will be appreciated that other output devices (not shown) are also contemplated, such as a speaker, a light-emitting indicator such as a Light Emitting Diode (LED), and the like. Display 116 includes display circuitry 120 controllable by processor 108 for generating representations of data and/or applications maintained in memory 112. Display 116 includes a flat panel display (e.g. Liquid Crystal Display (LCD), plasma display, Organic Light Emitting Diode (OLED) display). Circuitry 120 can thus include any suitable combination of display buffers, transistors, LCD cells, plasma cells, phosphors, and the like.

Mobile electronic device 104 also includes an input device 124 interconnected with processor 108. Input device 124 can include, without limitation, any suitable combination of a microphone, a keypad, an input navigation device such as a trackball, a trackpad, a camera and a touch screen device integrated with display 116.

Mobile electronic device 104 also includes a communications interface 128, such as a Network Interface Controller (NIC) and associated antennae or other hardware elements, interconnected with processor 108. As seen in FIG. 1, communications interface 128 allows mobile electronic device 104 to communicate, over a link 132, with other devices via a network 136. Network 136 can include any suitable combination of wired and/or wireless networks, including but not limited to a Wide Area Network ("WAN") such as the Internet, a Local Area Network ("LAN"), cell phone networks, WiFi networks, WiMax networks, and the like. Link 132 is compatible with network 136. In particular, link 132 can be a wireless link based on Global System for Mobile communications ("GSM"), General Packet Radio Service ("GPRS"), Enhanced Data rates for GSM Evolution ("EDGE"), and the third-generation mobile communication system (3G), Institute of Electrical and Electronic Engineers ("IEEE") 802.11 (WiFi), or other wireless protocols. Link 132 can also include any base stations and backhaul links necessary to connect mobile electronic device 104 to network 136. Communications interface 128 is therefore selected for compatibility with link 132 as well as with network 136.

The components of mobile electronic device 104 are interconnected, for example via a communication bus (not shown). Mobile electronic device 104 can be powered by a battery (not shown), though it is contemplated that mobile electronic device 104 can also be supplied with electricity by a wired connection to a wall outlet or other power source, for example when docked.

Mobile electronic device 104 stores in memory 112 one or more applications (not shown), each including computer-readable instructions for execution by processor 108. For example, memory 112 can store a web browser application for navigating the Internet and a messaging application for handling e-mail and other messages.

Mobile electronic device 104 also stores in memory 112 one or more service records, also referred to herein as service books. Service books are configuration files that configure mobile electronic device 104 and other devices to access various services. In the example embodiment shown in FIG. 1, a single service record 140 is stored in memory 112.

Service record 140 is identified by a unique, or substantially unique, service record identifier ("UID"). Service record 140 is shown as having the UID "SR03" and is thus also referred to herein as service record SR03 (similar nomenclature is used for other service records). Service record 140 also contains data (not shown in FIG. 1) for use in configuring mobile electronic device 104. Such configuration can include configuring mobile electronic device 104 to access a service. For example, service record 140 can be used for configuring mobile electronic device 104 to access an e-mail service. Service record 140 can thus contain data including a network address for an e-mail server (not shown). Processor 108 can thus be configured, via execution of the messaging application mentioned above, to consult service record 140 and use the network address contained therein to contact the e-mail server in order to send and receive e-mail messages.

It is contemplated that in some embodiments, mobile electronic device 104 can store a wide variety of service records in addition to service record 140 in memory 112. For example, other service records can contain data for configuring mobile electronic device 104 for web browsing, streaming media such as television programming, additional messaging services and the like.

Service record 140, and any other service records stored in memory 112, are provided to mobile electronic device 104 by a provisioning server 144. Provisioning server 144 provides service records to mobile electronic device 104 based on the selection of services that are available to mobile electronic device 104, for example under a subscription with a wireless service provider.

Provisioning server 144 can be based on any suitable server environment. In the present example embodiment, provisioning server 144 includes a processor 148 interconnected with a non-transitory computer readable storage medium such as memory 152. Memory 152 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. Provisioning server 144 also includes a communications interface 156, such as an NIC, interconnected with processor 148. Communications interface 156 allows provisioning server 144 to communicate with other devices, such as mobile electronic device 104, via a link 160 and network 136. Link 160 can be, for example, a wired link.

Provisioning server 144 can be managed by way of input and output devices (not shown) such as a keyboard and a display. Such input and output devices can be connected directly to provisioning server 144, for example via local connections such as Universal Serial Bus (USB) connections. In other embodiments, the input and output devices can be connected to a terminal (not shown) which communicates with provisioning server 144 via network 136.

Provisioning server 144 can be operated by any suitable entity, such as the above-mentioned wireless service provider or by a device manufacturer. In the present example embodiment, provisioning server 144 is operated by the manufacturer of mobile electronic device 104.

Provisioning server 144 stores, in memory 152, a provisioning application 164. Provisioning application 164 includes computer-readable instructions executable by processor 148. Processor 148 is thus configured, via execution of provisioning application 164, to carry out the functionality described below. Provisioning server 144 also stores in memory 152 a service records database 168, containing a plurality of service records for configuring devices such as mobile electronic device 104.

Figure 2:
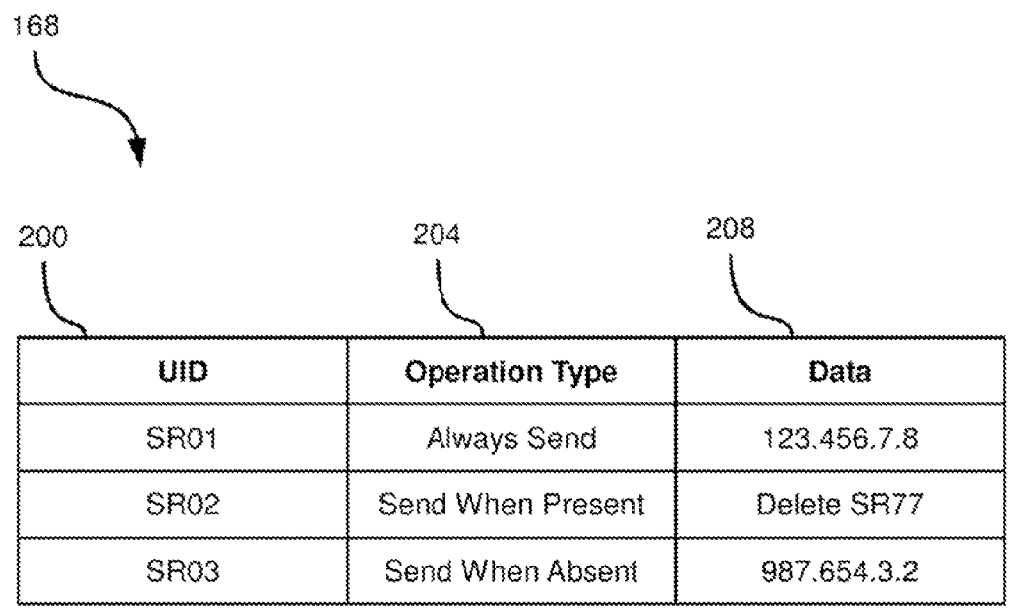
FIG. 2 depicts a service record database maintained by a provisioning server of the system of FIG. 1, according to a non-limiting embodiment.

Referring now to FIG. 2, an example service records database 168 is shown. Although service records database 168 is shown in tabular format for illustrative purposes, it is contemplated that any suitable format can be used.

Service records database 168 includes without limitation, for each service record, a UID shown in column 200, an operation type parameter shown in column 204 (which will be discussed in greater detail below), and the service record data shown in column 208 used to configure mobile electronic device 104. For example, the service record identified by the UID "SR03" contains data including a network address, which can be the network address of an e-mail server. It will now be apparent that service record SR03 is also stored in memory 112 of mobile electronic device 104. As a further example, the service record identified by the UID "SR02" contains data including an instruction to mobile electronic device 104 to delete another service record (not shown) from memory 112, if that service record is present in memory 112.

Figure 3:
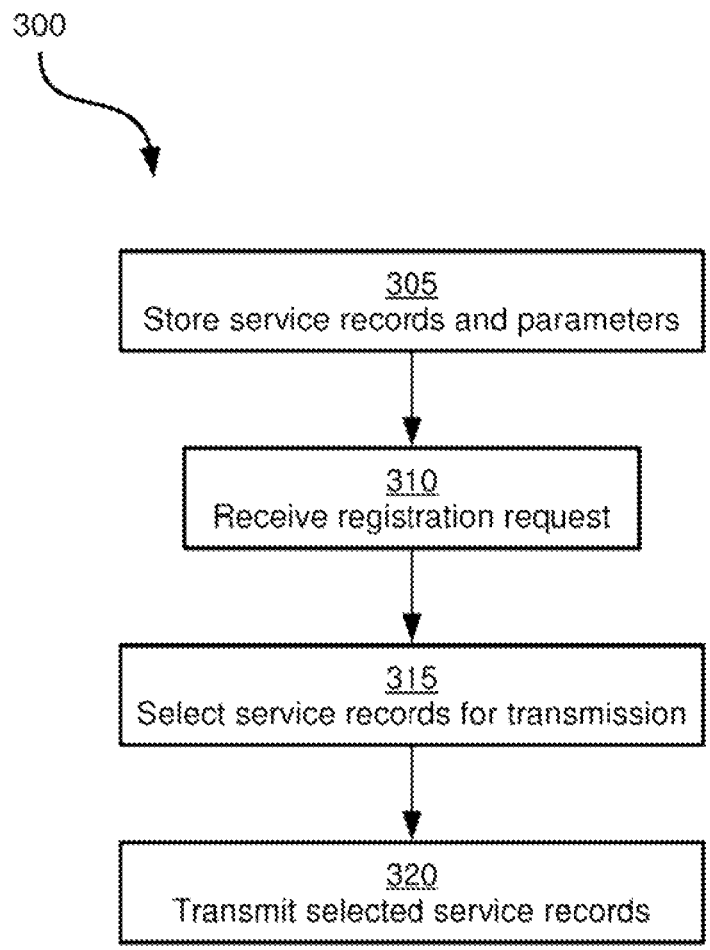
FIG. 3 depicts a method for configuring a mobile electronic device, according to a non-limiting embodiment.

Referring now to FIG. 3, a method 300 for configuring mobile electronic device 104 is shown. Method 300 will be discussed in connection with its performance on system 100. In general, method 300 is performed by provisioning server 144, and in particular by processor 148 as configured via execution of provisioning application 164. However, it is contemplated that method 300 can be performed on any suitable system.

Beginning at block 305, a plurality of service records are maintained in memory 152 of provisioning server 144. One of a plurality of operation type parameters is also stored in memory 152 in association with each service record. Performance of block 305 results in the maintenance of service record database 168, as discussed above, in memory 152. It is contemplated that in other embodiments, service record database 168 can be stored as separate databases. For example, one database may contain service record data, and another database may contain operation type parameters. In such arrangements, the databases can each include a common index (such as service record UIDs) to correlate their contents. Thus, operation type parameters would remain associated with service records, although in different databases.

Figure 4:
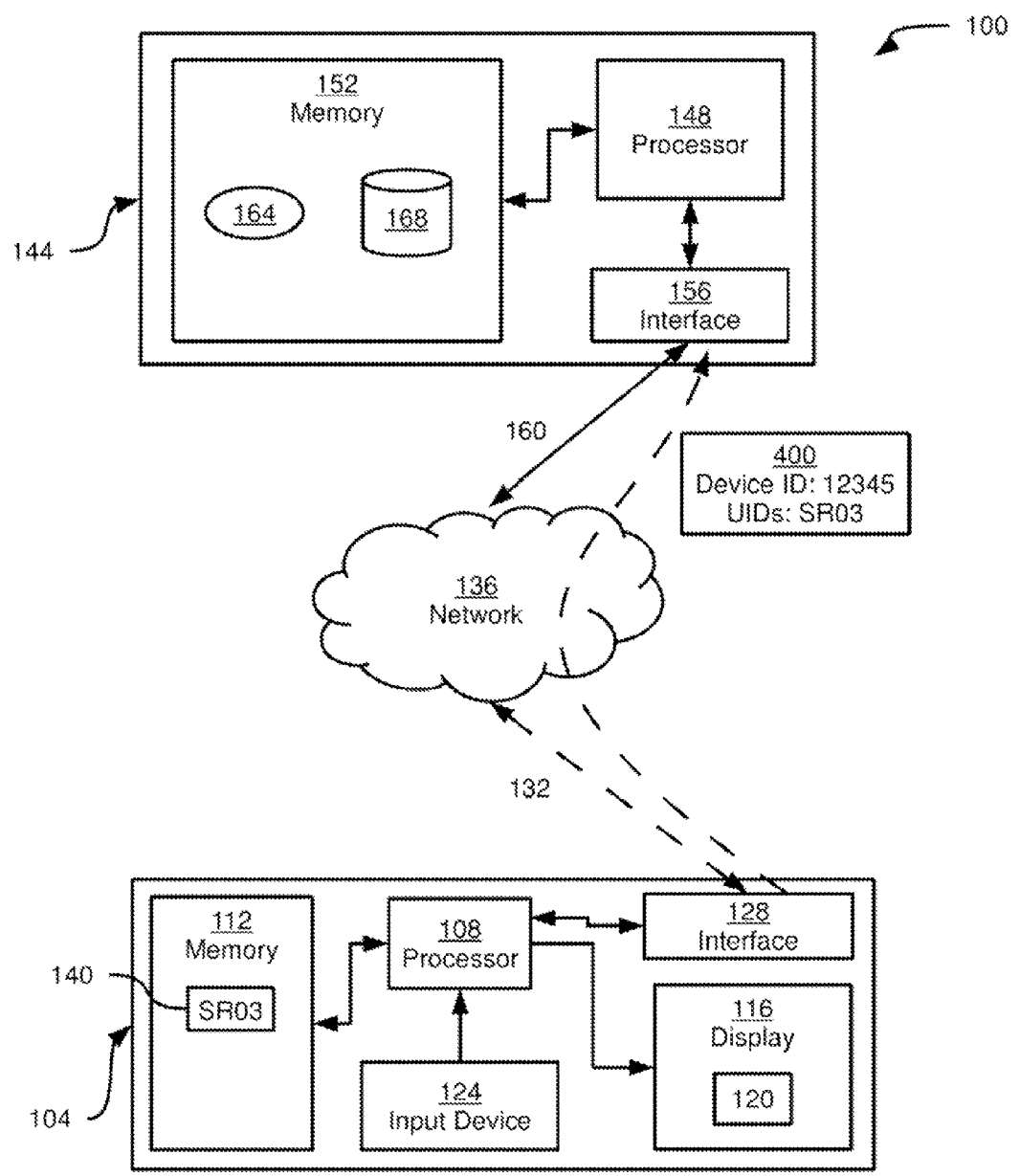
FIG. 4 depicts a performance of block 310 of the method of FIG. 3, according to a non-limiting embodiment.

Continuing to block 310, processor 148 is configured to receive, via communications interface 156, a registration request for mobile electronic device 104. Turning to FIG. 4, the performance of block 310 is depicted schematically. In particular, a registration request 400 originates from mobile electronic device 104 and is received at communications interface 156 of provisioning server 144 via network 136 and links 132 and 160. It is contemplated that in other non-limiting embodiments, registration request 400 is received at provisioning server 144 from mobile electronic device 104 via an intermediate server (not shown) rather than directly.

Mobile electronic device 104 is configured to transmit registration request 400 in response to certain events. For example, an update applied to software such as an operating system on mobile electronic device 104 can cause mobile electronic device 104 to transmit registration request 400. Mobile electronic device 104 can also be configured to transmit registration request 400 at configurable time intervals. Mobile electronic device 104 can also be configured to transmit a registration request in response to input data received at processor 108 from input device 124.

Registration request 400 can include an identifier for mobile electronic device 104, such as an International Mobile Equipment Identity ("IMEI") number, an International Mobile Subscriber Identity ("IMSI"), a Mobile Subscriber Integrated Services Digital Network Number ("MSISDN") or any other suitable identifier or combination of identifiers. Registration request 400 also includes one or more UIDs identifying which ones of service records from service record database 168 are maintained in memory 112 of mobile electronic device 104. Thus, as shown in FIG. 4, registration request 400 contains the UID "SR03", identifying service record 140.

Returning to FIG. 3, following receipt and storage of registration request 400 in memory 152, method 300 proceeds to block 315. At block 315, processor 148 is configured to select service records from service record database 168 for transmission to mobile electronic device 104.

The selection of service records at block 315 is based at least on the operation type parameters in service record database 168. The selection of service records at block 315 can additionally be based on the UIDs received from mobile electronic device 104.

In performing block 315 of method 300, processor 148 is configured to traverse service record database 168 and, for each service record in service record database 168, to examine the associated operation type parameter. Three operation type parameters are contemplated, as shown in FIG. 2: "Always Send", "Send When Absent" and "Send When Present".

When the operation type parameter associated with a particular service record is Always Send, processor 148 is configured to always select that service record for transmission to mobile electronic device 104. Thus, service record SR01 as shown in FIG. 2 will be selected at block 315 of method 300. It is contemplated that the "Always Send" operation type parameter need not explicitly include the expression "Always Send". More generally, an Always Send operation type parameter comprises an indication that the associated service record is always to be selected for transmission. The actual data defining an Always Send parameter is not particularly limited, and can include, for example, a binary string, an alphanumeric string (which, as will now be understood, can be represented in binary format in memory 152) or any other suitable data.

When the operation type parameter associated with a particular service record is Send When Absent, processor 148 is configured to select that service record only when the UID of the service record was not included in the registration request from mobile electronic device 104. Thus, service record SR03 as shown in FIG. 2 will not be selected at block 315 of method 300, because SR03 was included in registration request 400. It is contemplated that the "Send When Absent" operation type parameter need not explicitly include the expression "Send When Absent". In general, as noted in connection with the Always Send parameter, a Send When Absent parameter generally comprises an indication that the service record is to be selected when the UID of the service record was not present in the registration request.

When the operation type parameter associated with a particular service record is Send When Present, processor 148 is configured to select that service record for transmission only when the UID of the service record was included in the registration request received at block 310. Thus, service record SR02 as shown in FIG. 2 will not be selected at block 315 of method 300 because the UID SR02 was not included in registration request 400. It is contemplated that the "Send When Present" operation type parameter need not explicitly include the expression "Send When Present". In general, as noted in connection with the Always Send and Send When Absent parameters, a Send When Present parameter generally comprises an indication that the service record is to be selected when the UID of the service record was present in the registration request.

In summary, in the present example performance of method 300, processor 148 will select only service record SR01 for transmission to mobile electronic device at block 315.

Proceeding to block 320, processor 148 is configured to transmit the selected service records to mobile electronic device 104. It is contemplated that the UID and data for each selected service record are transmitted at block 320, but not the operation type parameter. In other embodiments, however, the operation type parameter can also be transmitted at block 320.

Figure 5:
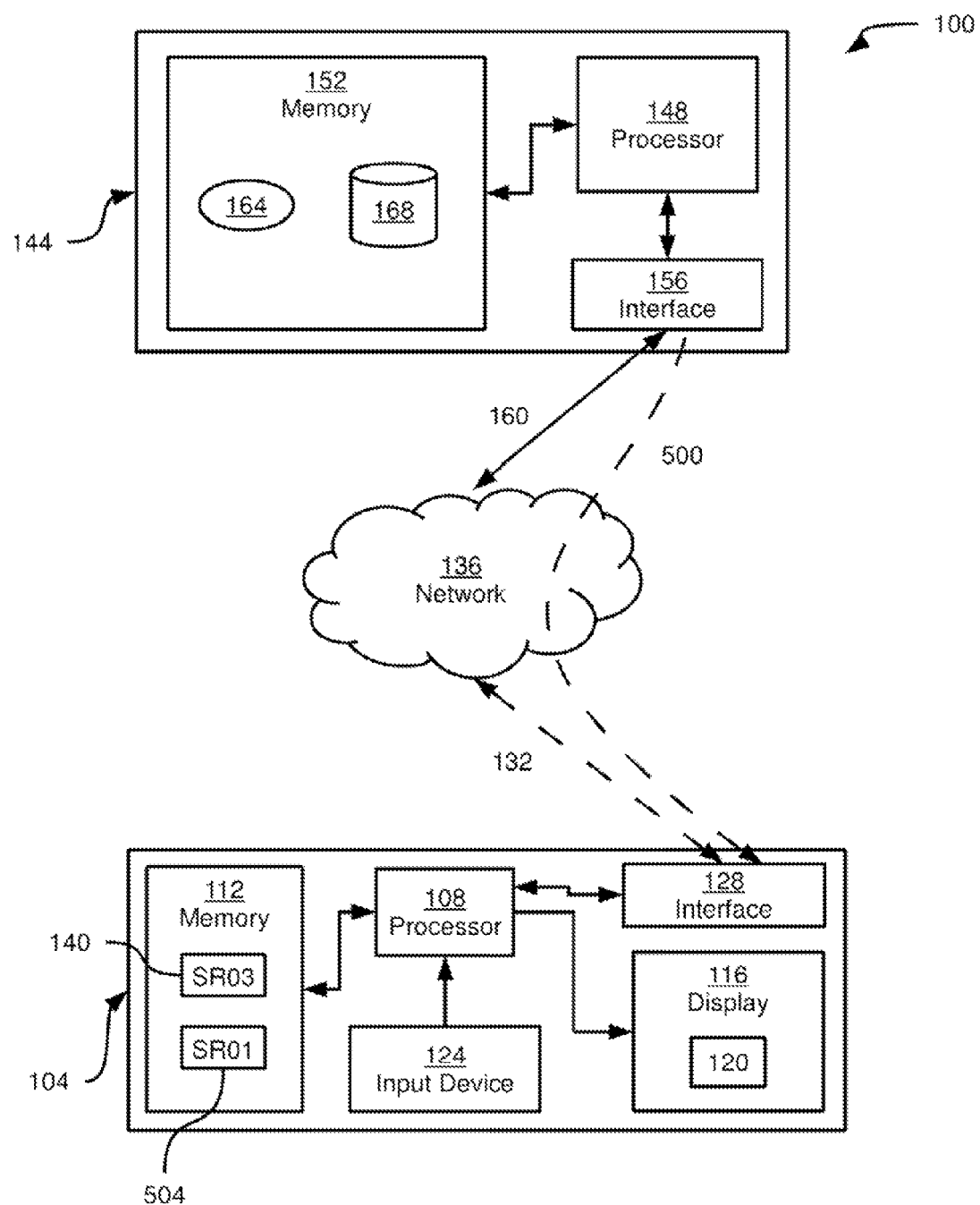
FIG. 5 depicts a performance of block 320 of the method of FIG. 3, according to a non-limiting embodiment.

Referring to FIG. 5, performance of block 320 is depicted schematically. Service record SR01 is transmitted to mobile electronic device 104 in transmission 500. Although transmission 500 is made directly to mobile electronic device 104, it is contemplated that in other non-limiting embodiments, provisioning server 144 can transmit service records to an intermediate server (not shown), which then forwards the service records to mobile electronic device 104.

Having received the transmission from provisioning server 144, mobile electronic device 104 stores the new service record 504 in memory 112. Upon receipt and storage of service record 504 (i.e. service record SR01), mobile electronic device 104 will be configured to access the relevant services. For example, the network address contained within the service record identified by the UID SR01 can be the address of a server which provides web browsing services to mobile electronic device 104. Thus, upon receipt and storage of the service record, shown as service record 500 in FIG. 5, mobile electronic device 104 will be configured to access the web browsing services.

Figure 6:
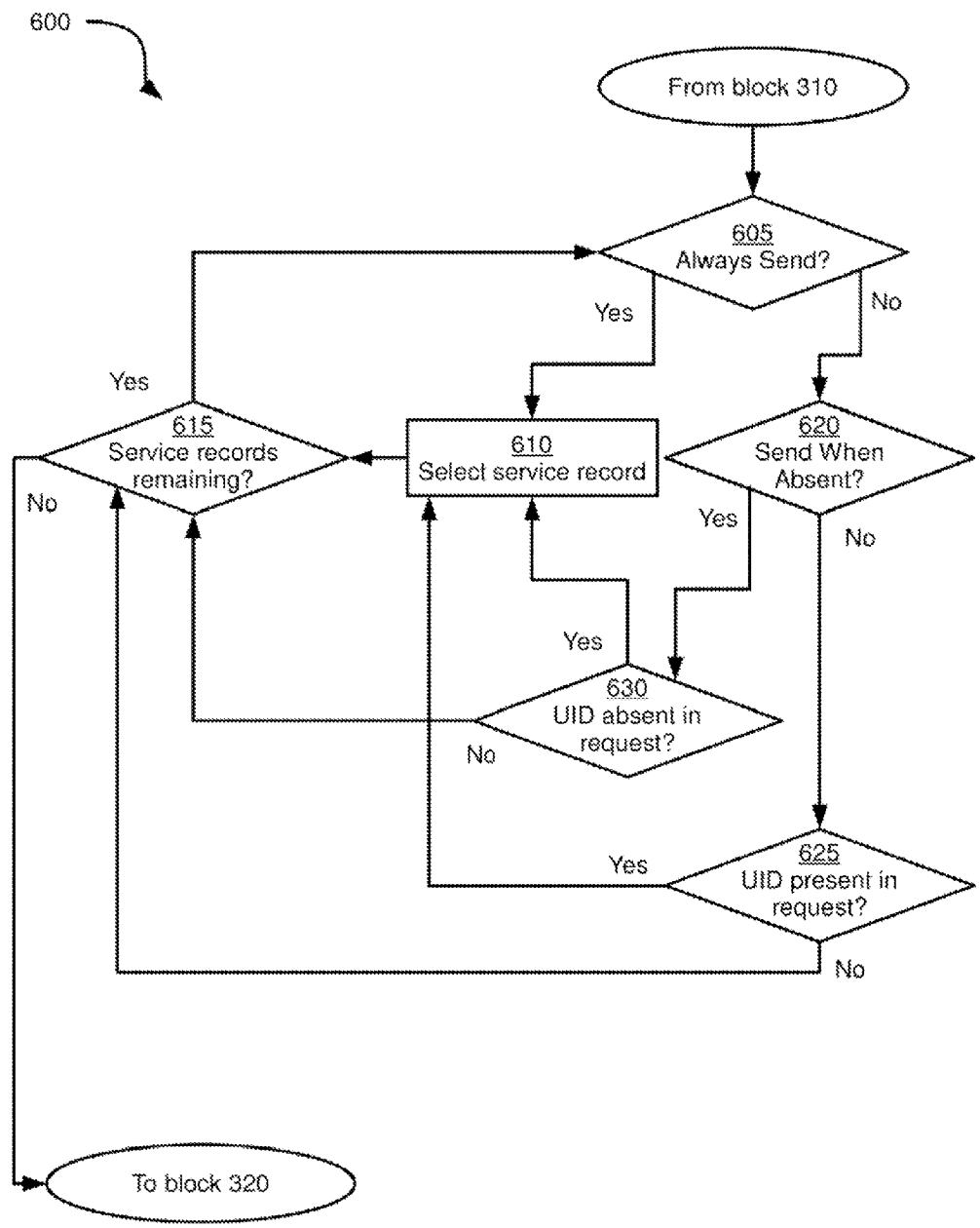
FIG. 6 depicts a method of performing block 315 of the method of FIG. 3, according to a non-limiting embodiment.

A variety of suitable methods can be used in making the selection at block 315. Referring now to FIG. 6, a non-limiting example of such a method is shown at 600. Following the performance of block 310, processor 148 can be configured to proceed to block 605. At block 605, processor 148 is configured to retrieve a service record from service record database 168 and determine whether the operation type parameter of that service record is Always Send. Thus, beginning with service record SR01 as shown in FIG. 2, processor 148 determines affirmatively that the operation type is Always Send and proceeds to block 610. At block 610, service record SR01 is selected for transmission. For example, service record SR01 can be flagged for transmission in service record database 168. In other embodiments, service record SR01 can be copied to a temporary storage location in memory 152 prior to transmission.

Following the selection of a service record at block 610, method 600 proceeds to block 615, at which processor 148 determines whether any service records in service record database 168 remain to be processed.

Because service records SR02 and SR03 have not yet been processed, the determination at block 615 will be affirmative, and processor 148 will retrieve the next service record and return to block 605. Thus, at block 605 processor 148 is configured to determine whether the operation type parameter of service record SR02 is Always Send. As seen in FIG. 2, the operation type parameter of service record SR02 is not Always Send, and thus method 600 proceeds to block 620.

At block 620, processor 148 is configured to determine whether the operation type parameter is Send When Absent. Again, referring briefly to FIG. 2, the determination at block 620 will be negative, as the operation type parameter of service record SR02 is not Send When Absent, but rather Send When Present. Thus, method 600 will proceed to block 625.

At block 625, given that the operation type parameter has been determined not to be Always Send or Send When Absent, processor 148 can be configured to assume that the operation type parameter is Send When Present and determine whether the UID of the current service record is present in the registration request received at block 310. As discussed earlier, the registration request included only the UID SR03, and thus the determination for service record SR02 at block 625 is negative. Service record SR02 is therefore not selected for transmission, and method 600 returns to block 615. If SR02 had been included in registration request 400, method 600 would have proceeded from block 625 to block 610, at which service record SR02 would be selected for transmission.

At block 615, processor 148 determines that there are still service records remaining to be processed (in particular, service record SR03). Processor 148 thus retrieves service record SR03 from memory 152 and determines whether the operation type parameter for service record SR03 is Always Send at block 605. The determination at block 605 is negative, as can be seen from FIG. 2. Proceeding to block 620, the determination will be affirmative, as the operation type parameter associated with service record SR03 is Send When Absent. Processor 148 will thus be configured to proceed to block 630, at which it is configured to determine whether the UID SR03 is absent from registration request 400. Because SR03 was present in registration request 400, the determination at block 630 will be negative, and method 600 will proceed to block 615. At block 615, the determination will be negative, as SR03 is the final service record in the example service record database 168 of FIG. 2. Thus, proceeding to block 320, processor 148 is configured to transmit the service records selected at the above performances of block 610. Thus, in the present example performance, processor 148 transmits service record SR01, as shown in FIG. 5.

It is contemplated that alternatives to method 600 can also be employed. For example, block 625 can be replaced with an explicit determination as to whether the operation type parameter of the current service record is Send When Present, followed by a determination as to whether the UID is present in the request.

In other embodiments, service record database 168 can include additional parameters. For example, some service records can be flagged or otherwise identified in database 168 as being "one-time" service records. Such service records are to be sent to mobile electronic device 104 if mobile electronic device 104 is eligible to receive one-time service records, regardless of the operation type parameter or other parameters in database 168. Provisioning server 144 can also maintain in memory 152 an indication of whether or not mobile electronic device 104 is eligible for receiving one-time service records. In general, after one or more one-time service records have been transmitted to mobile electronic device 104, mobile electronic device 104 is no longer eligible.

Provisioning server 144 can also maintain a wide variety of service records, not all of which are relevant to mobile electronic device 104. That is, some service records may only be relevant to other devices. Provisioning server 144 can thus also maintain a list of which services mobile electronic device 104 is registered. Such a list can be associated in memory 152 with an identifier (such as a MSISDN) of mobile electronic device 104. In such embodiments, processor 148 can be configured, prior to performing block 315 of method 300, to retrieve only the service records pertaining to services for which mobile electronic device 104 is registered. In other words, block 315 (for example, as embodied in method 600) can be performed by traversing only certain ones of the services records in service record database 168.

Those skilled in the art will appreciate that in some embodiments, the functionality of processor 148 as configured by execution of provisioning application 164 can be implemented using pre-programmed hardware or firmware elements (e.g., application specific integrated circuits (ASICs), electrically erasable programmable read-only memories (EEPROMs), etc.), or other related components.

Certain advantages will now be apparent to those skilled in the art. For example, the basing of the determination at block 315 on the operation type parameters as well as the UIDs listed in the registration request can result in better use of the resources of mobile electronic device 104. In particular, in the above example performance of methods 300 and 600, the use of operation type parameters and UIDs from the registration request resulted in service record SR02 not being transmitted to mobile electronic device 104 unnecessarily, thus reducing usage of at least the device's limited bandwidth and memory resources. Other advantages may also occur to those skilled in the art.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A method for configuring a mobile electronic device, the method comprising:
   storing, in a memory of a provisioning server, a plurality of service records each containing configuration data, and one of a plurality of operation type parameters in association with each service record, each operation type parameter indicating a condition under which the associated service record is to be selected for transmission;
   receiving, at the provisioning server, a registration request for the mobile electronic device, the registration request including one or more identifiers identifying ones of the service records for which the configuration data is maintained in the mobile electronic device;
   selecting, based on the received identifiers and the operation type parameters, at least one of the service records stored in the memory for transmission to the mobile device; and, transmitting the at least one selected service record from the provisioning server to the mobile device, wherein the selecting at least one of the service records comprises:

examining the associated operation type parameter for one of the plurality of service records;

performing a first determination as to whether the associated operation type parameter is an Always Send parameter;

when the first determination is affirmative, selecting the service record, when the first determination is negative, performing a second determination as to whether the associated operation parameter is a Send When Absent parameter; and, when the second determination is affirmative, selecting the service record if the registration request does not include an identifier identifying the service record.

2. The method of claim 1, wherein selecting at least one service record comprises:

for each service record stored in the memory, examining the associated operation type parameter; and when the associated operation type parameter is an Always Send parameter, selecting the service record.

3. The method of claim 2, further comprising:

when the associated operation type parameter is a Send When Absent parameter, selecting the service record if the registration request does not include an identifier identifying the service record.

4. The method of claim 3, further comprising:

when the associated operation type parameter is a Send When Present parameter, selecting the service record if the registration request includes an identifier identifying the service record.

5. The method of claim 1, wherein selecting at least one service record further comprises:

when the second determination is negative, performing a third determination as to whether the registration request includes an identifier identifying the service record; and when the third determination is affirmative, selecting the service record.

6. The method of claim 5, wherein selecting at least one service record further comprises:

repeating the examining, performing a first determination and selecting for each of the plurality of service records.

7. The method of claim 1, wherein each of the plurality of service records contains data for configuring the mobile electronic device.

8. A provisioning server, comprising:

a memory for storing a plurality of service records each containing configuration data, and one of a plurality of operation type parameters in association with each service record, each operation type parameter indicating a condition under which the associated service record is to be selected for transmission;

a communications interface for receiving a registration request for a mobile electronic device, the registration request including one or more identifiers identifying ones of the service records for which the configuration data is maintained in the mobile electronic device; and, a processor interconnected with the memory and the communications interface, the processor configured to select, based on the received identifiers and the operation type parameters, at least one of the service records stored in the memory for transmission to the mobile device, the processor further configured to transmit the at least one selected service record via the communications interface to the mobile device, wherein the processor is further configured to select at least one of the service records by:

examining the associated operation type parameter for one of the plurality of service records;

performing a first determination as to whether the associated operation type parameter is an Always Send parameter;

when the first determination is affirmative, selecting the service record, when the first determination is negative, performing a second determination as to whether the associated operation parameter is a Send When Absent parameter; and, when the second determination is affirmative, selecting the service record if the registration request does not include an identifier identifying the service record.

9. The provisioning server of claim 8, wherein selecting at least one service record comprises:

for each service record stored in the memory, examining the associated operation type parameter; and when the associated operation type parameter is an Always Send parameter, selecting the service record.

10. The provisioning server of claim 9, further comprising:

when the associated operation type parameter is a Send When Absent parameter, selecting the service record if the registration request does not include an identifier identifying the service record.

11. The provisioning server of claim 10, further comprising:

when the associated operation type parameter is a Send When Present parameter, selecting the service record if the registration request includes an identifier identifying the service record.

12. The provisioning server of claim 8, wherein selecting at least one service record further comprises:

when the second determination is negative, performing a third determination as to whether the registration request includes an identifier identifying the service record; and when the third determination is affirmative, selecting the service record.

13. The provisioning server of claim 12, wherein selecting at least one service record further comprises:

repeating the examining, performing a first determination and selecting for each of the plurality of service records.

14. The provisioning server of claim 8, wherein each of the plurality of service records contains data for configuring the mobile electronic device.

15. A non-transitory computer-readable medium for storing a plurality of computer-readable instructions executable by a processor for configuring the processor to perform a method comprising:

storing, in a memory of a provisioning server, a plurality of service records each containing configuration data, and one of a plurality of operation type parameters in association with each service record, each operation type parameter indicating a condition under which the associated service record is to be selected for transmission;

receiving, at the provisioning server, a registration request for the mobile electronic device, the registration request including one or more identifiers identifying ones of the service records for which the configuration data is maintained in the mobile electronic device;

selecting, based on the received identifiers and the operation type parameters, at least one of the service records stored in the memory for transmission to the mobile device; and, transmitting the at least one selected service record from the provisioning server to the mobile device, wherein the selecting at least one of the service records comprises:

examining the associated operation type parameter for one of the plurality of service records;

performing a first determination as to whether the associated operation type parameter is an Always Send parameter;

when the first determination is affirmative, selecting the service record, when the first determination is negative, performing a second determination as to whether the associated operation parameter is a Send When Absent parameter; and, when the second determination is affirmative, selecting the service record if the registration request does not include an identifier identifying the service record.

16. The non-transitory computer-readable medium of claim 15, wherein selecting at least one service record comprises:

for each service record stored in the memory, examining the associated operation type parameter; and when the associated operation type parameter is an Always Send parameter, selecting the service record.

17. The non-transitory computer-readable medium of claim 16, wherein the method further comprises:

when the associated operation type parameter is a Send When Absent parameter, selecting the service record if the registration request does not include an identifier identifying the service record.

18. The non-transitory computer-readable medium of claim 17, wherein the method further comprises:

when the associated operation type parameter is a Send When Present parameter, selecting the service record if the registration request includes an identifier identifying the service record.

19. The non-transitory computer-readable medium of claim 15, wherein selecting at least one service record further comprises:

when the second determination is negative, performing a third determination as to whether the registration request includes an identifier identifying the service record; and when the third determination is affirmative, selecting the service record.

20. The non-transitory computer-readable medium of claim 15, wherein each of the plurality of service records contains data for configuring the mobile electronic device.

* * * * *